(12) United States Patent
McCaffrey et al.

(10) Patent No.: US 9,133,726 B2
(45) Date of Patent: Sep. 15, 2015

(54) SEAL FOR GAS TURBINE ENGINE COMPONENT

(75) Inventors: Michael G. McCaffrey, Windsor, CT (US); Eric A. Hudson, Harwinton, CT (US)

(73) Assignee: United Technologies Corporation, Hartford, CT (US)

( * ) Notice: Subject to any disclaimer, the term of this patent is extended or adjusted under 35 U.S.C. 154(b) by 2769 days.

(21) Appl. No.: 11/856,132

(22) Filed: Sep. 17, 2007

(65) Prior Publication Data
US 2009/0074563 A1 Mar. 19, 2009

(51) Int. Cl.
*F01D 11/08* (2006.01)

(52) U.S. Cl.
CPC ............... *F01D 11/08* (2013.01); *Y02T 50/672* (2013.01)

(58) Field of Classification Search
USPC ......... 415/115, 159, 173.2, 174.2; 416/87, 92
See application file for complete search history.

(56) References Cited

U.S. PATENT DOCUMENTS

| | | | |
|---|---|---|---|
| 3,339,933 A * | 9/1967 | Foster | 277/415 |
| 4,169,692 A * | 10/1979 | McDonough et al. | 415/115 |
| 4,193,738 A * | 3/1980 | Landis et al. | 415/115 |
| 4,472,108 A | 9/1984 | Pask | |
| 4,834,613 A | 5/1989 | Hansen | |
| 5,039,277 A | 8/1991 | Naudet | |
| 5,190,439 A | 3/1993 | Das | |
| 5,281,087 A | 1/1994 | Hines | |
| 5,622,473 A | 4/1997 | Payling | |
| 5,704,762 A * | 1/1998 | Schultze | 415/200 |
| 5,752,802 A * | 5/1998 | Jones | 415/170.1 |
| 5,807,072 A | 9/1998 | Payling | |
| 5,941,537 A * | 8/1999 | Wallace et al. | 277/642 |
| 6,146,093 A | 11/2000 | Lammas | |
| 6,210,106 B1 | 4/2001 | Hawkins | |
| 6,808,364 B2 | 10/2004 | O'Reilly | |
| 6,926,496 B2 * | 8/2005 | Ackermann et al. | 415/191 |
| 6,966,755 B2 * | 11/2005 | Garner | 416/87 |
| 6,976,824 B2 * | 12/2005 | Nottin | 415/115 |
| 6,984,104 B2 | 1/2006 | Alexander | |
| 7,112,039 B2 | 9/2006 | Brooks | |
| 2005/0008481 A1 | 1/2005 | Nottin et al. | |

OTHER PUBLICATIONS

Extended European Search Report for EP Application No. 08253045.2 dated Oct. 28, 2011.

* cited by examiner

*Primary Examiner* — Dwayne J White
*Assistant Examiner* — Adam W Brown
(74) *Attorney, Agent, or Firm* — Carlson, Gaskey & Olds, P.C.

(57) ABSTRACT

A gas turbine engine component includes a pressurized fluid source, an airfoil, and a seal member for selectively providing sealing at an end of the airfoil. The seal member includes a stowed position for non-sealing and a deployed position for sealing. The seal member is operatively connected with a pressurized fluid source for moving the seal member between the stowed position and the deployed position.

20 Claims, 3 Drawing Sheets

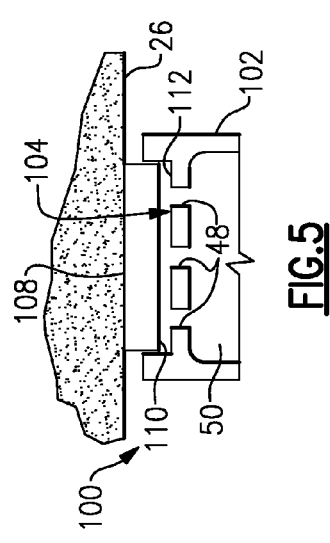
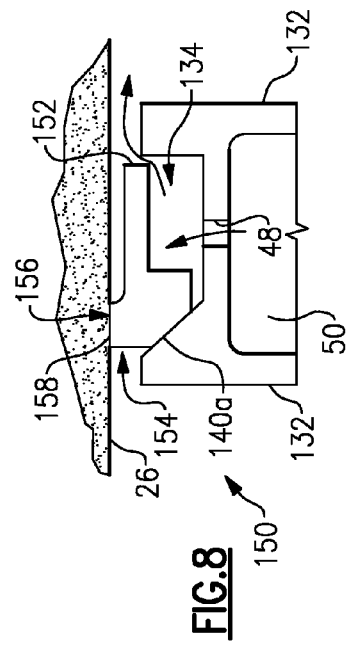
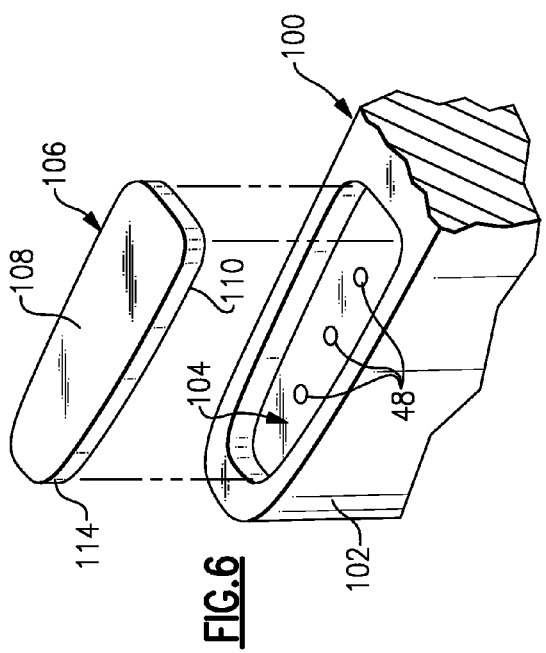
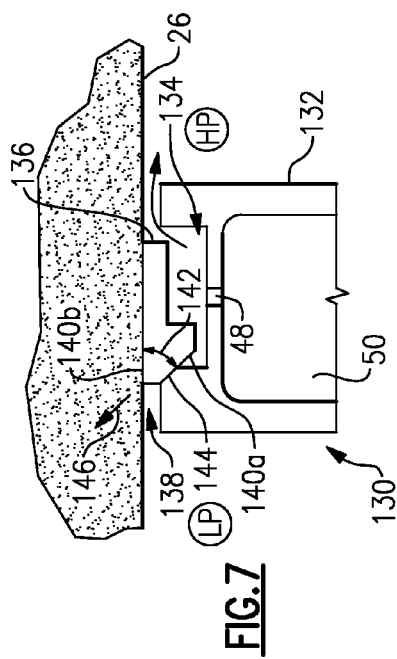

SEAL FOR GAS TURBINE ENGINE COMPONENT

BACKGROUND OF THE INVENTION

This disclosure relates to a gas turbine engine component and, more particularly, to an edge seal for a movable gas turbine engine component.

Gas turbine engines typically include a turbine section that includes one or more stages of rotating turbine blades and relatively stationary turbine vanes. In certain designs, the turbine vanes are adjustable such that each turbine vane is rotatable about its longitudinal axis. Also known as variable turbine vanes, the vanes may thereby be adjusted to provide a desirable orientation for controlling engine performance. For example, the turbine vane includes an airfoil section and a trunnion that rotatably connects the airfoil to a support structure. An actuator selectively rotates the airfoil section about the trunnion between desired positions.

Although effective for engine control, adjustable vanes may present a sealing problem between the airfoil section and the support structure. For example, there is typically a gap between the airfoil section and the support structure that permits the airfoil section to rotate without interference or binding from the support structure. However, the gap provides a flow path for combustion gas between a high pressure side and a low pressure side of the vane (i.e., a pressure gradient). The combustion gas may be hotter than a melting temperature of the structural support or the end of the airfoil section and thereby cause damage to these components. Furthermore, leakage of the combustion gas through the gap rather than over the surfaces of the airfoil section may contribute to engine inefficiency.

SUMMARY OF THE INVENTION

An example gas turbine engine component includes a pressurized fluid source, an airfoil, and a seal member for selectively providing sealing at an end of the airfoil. The seal member includes a stowed position for non-sealing and a deployed position for sealing. The seal member is operatively connected with the pressurized fluid source for moving the seal member between the stowed position and the deployed position.

In another aspect, the gas turbine engine component is incorporated within a gas turbine engine that includes a combustion section, a turbine section downstream from the combustion section, and a structure including a flow passage for conveying a gas flow associated with the combustion section, the turbine section, or both. The airfoil is at least partially within the gas flow passage and the seal member selectively provides sealing between the structure and the end of the airfoil.

An example method of providing sealing includes selectively moving the seal member relative to the end of the airfoil between the stowed position for non-sealing and a deployed position for sealing.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 5 illustrates another example vane and seal member in a deployed position.

FIG. 6 illustrates an exploded view of the seal member of FIG. 5.

FIG. 7 illustrates another example vane and seal member having a wedge section.

FIG. 8 illustrates another example vane and seal member having another type of wedge section.

DETAILED DESCRIPTION OF THE PREFERRED EMBODIMENT

The example seals described herein are between a structural support and an airfoil to facilitate reducing combustion gas leakage.

Figure 1:
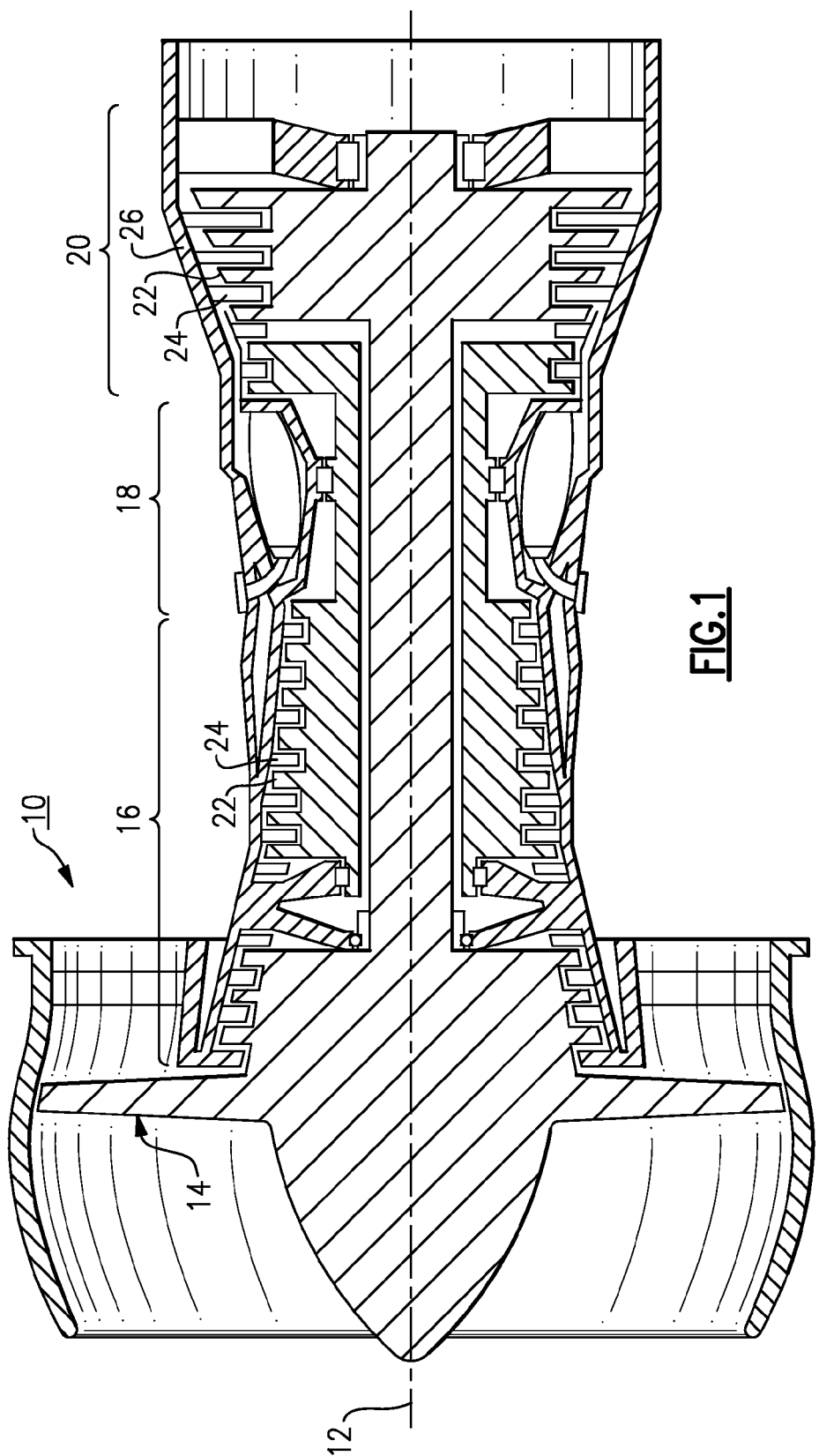
FIG. 1 illustrates an example gas turbine engine.

FIG. 1 illustrates selected portions of an example gas turbine engine 10, such as a gas turbine engine used for propulsion. In this example, the gas turbine engine 10 is circumferentially disposed about an engine centerline 12 and includes a fan 14, a compressor section 16, a combustion section 18, and a turbine section 20. The compressor section 16 and the turbine section 20 include corresponding blades 22 and vanes 24. In other examples, the gas turbine engine 10 may include additional engine sections or fewer engine sections than are shown in the illustrated example, depending on the type of engine and its intended use.

Generally, air compressed in the compressor section 16 is mixed with fuel and burned in the combustion section 18 to produce combustion gases that are expanded in the turbine section 20. FIG. 1 is a schematic presentation for illustrative purposes only and is not a limitation on the disclosed examples. Additionally, there are various types of gas turbine engines, many of which could benefit from the examples disclosed herein and are not limited to the designs shown.

Figure 2:
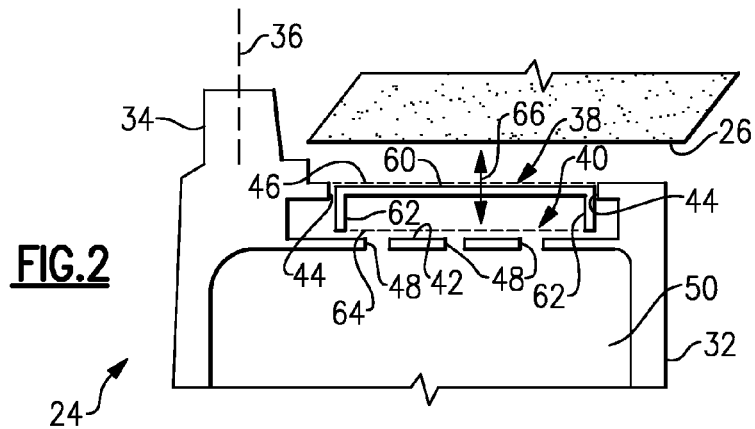
FIG. 2 illustrates selected portions of an example vane having a seal member that is in a non-deployed position.

FIG. 2 illustrates an example of one of the vanes 24 from the turbine section 20 of the gas turbine engine 10. Although the vane 24 is depicted in this example, it is to be understood that the example is applicable to the blades 22 or other components in which an edge seal would be desirable.

In the illustrated example, the vane 24 includes an airfoil section 32 and a trunnion 34 that extends from the airfoil section 32 to permit rotational movement of the vane 24 about rotational axis 36. The airfoil section 32 includes a seal member 38 for providing a seal between an end of the airfoil section 32 and an outer structure 26, such as an outer air seal or case, to facilitate reducing combustion gas flow between a high pressure side and a low pressure side of the vane 24. it is to be understood that the seal member 38 may be used at a radially inner end and/or radially outer end of the vane 24.

In the illustrated example, the airfoil section 32 includes a pocket 40 that at least partially receives the seal member 38. In this example, the pocket 40 includes a floor 42, side walls 44 connected with the floor 42, and an open side 46 (represented with a dashed line) that together define a cavity for accommodating the seal member 38 in a non-deployed position as shown.

In the illustrated example, the floor 42 of the pocket 40 includes openings 48 that fluidly connect the pocket 40 with an air cooling passage 50 (i.e., a fluid passage) within the airfoil section 32. In one example, the air cooling passage 50 is fluidly connected with another source of relatively cool, pressurized air, such as a bleed flow from the compressor section 16 or other pressurized fluid source. It is to be understood that although the air cooling passage 50 is illustrated as a cavity in the illustrated example, the air cooling passage 50 may have any suitable form such as, but not limited to, serpentine passages.

In this example, the seal member 38 includes a seal surface 60 that connects side walls 62. The seal surface 60 and side walls 62 define a cavity within the seal member 38 that opens to an open side 64 (represented by a dashed line) adjacent the floor 42 of the pocket 40. In the illustrated example, the seal member 38 is slightly smaller in size than the pocket 40 such that the seal member 38 is movable along an axial direction 66 between the non-deployed position shown in FIG. 2 and a deployed position shown in FIGS. 3 and 4.

Figure 3:
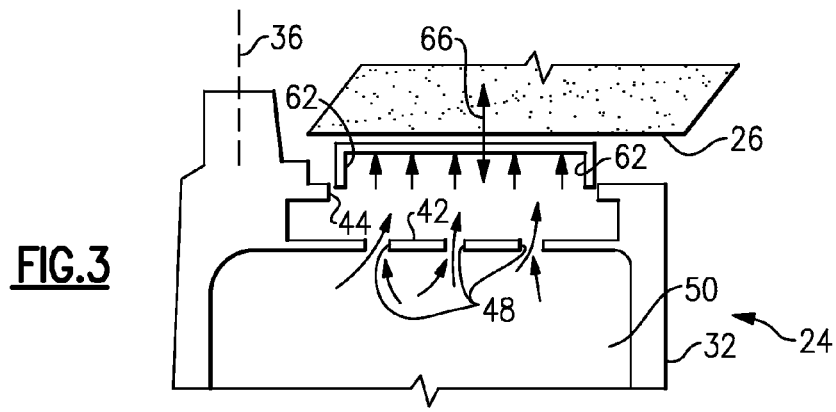
FIG. 3 illustrates the vane having a seal member that is in a deployed position.
Figure 4:
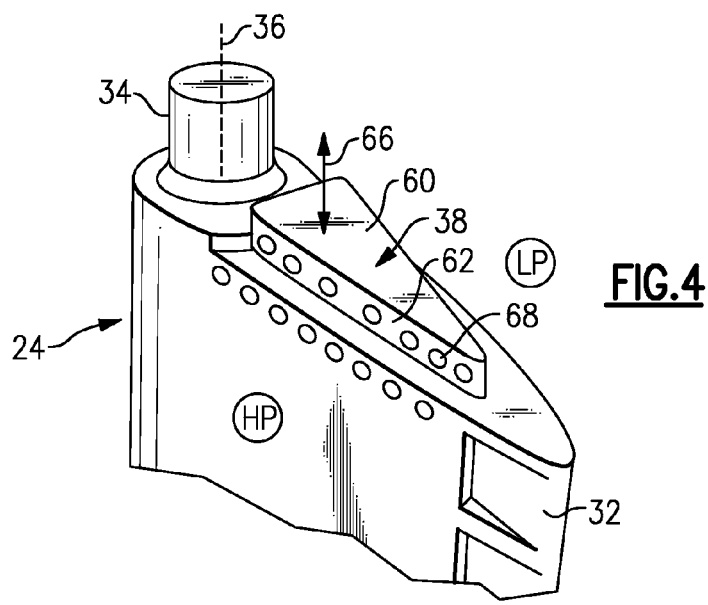
FIG. 4 illustrates a perspective view of the vane and seal member in the deployed position.

Referring to FIGS. 3 and 4, the seal member 38 is generally triangular shaped such that a portion of the side wall 62 corresponds to a high pressure side HP of the vane 24 and another portion of the side wall 62 corresponds to a low pressure side LP of the vane 24. In the illustrated example, the portion of the side wall 62 that faces the high pressure side HP includes openings 68 that extend through the side wall 62 to fluidly connect the internal cavity of the seal member 38 with the cavity provided by the pocket 40, as will be described below.

In operation, the seal member 38 is initially in a non-deployed position as illustrated in FIG. 2. To move the seal member 38 to a deployed position, the air cooling passage 50 provides pressurized air through the openings 48 into the pocket 40. The pressurized air increases an air pressure within the pocket 40 and exerts an outward force on the seal member 38 to move the seal member 38 to a deployed position. Continuous supply of the pressured air exerts a relatively uniform force on the seal member 38 to provide a corresponding relatively uniform seal between the seal member 38 and the outer structure 26. That is, the relatively flat plane provided by the seal surface 60 substantially contacts the relatively flat plane provided by the outer structure 26. Thus, the sealing between the seal member 38 and the outer structure 26 facilitates reducing gas flow between the high pressure side HP and the low pressure side LP of the vane 24. Additionally, a reduced amount of cooling or no cooling may be facilitated for the end of the airfoil section 32 or the outer structure 26.

In the illustrated example, the airfoil section 32 and seal member 38 may be manufactured in any suitable process and from any suitable types of materials. For example, the pocket 40 can be formed in the end of the airfoil section 32 using known casting methods or by machining the pocket 40 into an existing airfoil section 32. In one example, the machining includes electro-discharge machining and facilitates defining the dimensions of the pocket 40 such that there is a relatively small clearance between the side walls 44 of the pocket 40 and the seal member 38. Furthermore, the airfoil section 32 may be formed from any suitable type of material such as, but not limited to, nickel-based alloys.

In one example, the seal member 38 is formed from a material that provides a desired amount of wear resistance when in contact with the outer structure 26. For example, the material of the seal member 38 may be selected based upon an estimated amount of wear between the seal member 38 and the outer structure 26. In one example, the seal member 38 is formed from a ceramic material, a metal or metal alloy material, or a composite material. In one example, the ceramic material is silicon nitride. In another example, the seal member 38 is made from a nickel-based alloy. In another example, the seal member 38 is made of a ceramic matrix composite.

The seal member 38 may also include a coating to protect the underlying material of the seal member 38 from corrosion, erosion, or oxidation. For example, the coating may include a relatively hard material such as titanium dioxide or carbide. Given this description, one of ordinary skill in the art will be able to select other suitable materials and coatings for the seal member 38 based on their particular needs.

FIGS. 5 and 6 illustrate another example of a selected portion of a vane 100 that can be used in the gas turbine engine 10 in a similar manner as the vane 24 described above. In this example, components that are similar to components of the previous example are numbered alike. The vane 100 includes an airfoil section 102 having a pocket 104 located near an end of the airfoil section 102. A seal member 106 is received at least partially within the pocket 104 and operates similarly to the seal member 38 in the previous example. However, in this example, the pocket 104 and seal member 106 are shaped differently than the pocket 40 and seal member 38 of the previous example.

The seal member 106 is a relatively planar plate. The plate includes a seal surface 108 for sealing against the outer structure 26, an opposite surface 110 corresponding to a floor 112 of the pocket 104, and side walls 114 that connect the seal surface 108 and the opposite surface 110. Although the surfaces 108 and 110 of the seal member 106 are shown as relatively planar surfaces in the illustrated example, it is to be understood that the surfaces 108 and 110 could alternatively have a curvature that corresponds to a curvature of an outer structure.

In operation, the movement of the seal member 106 is similar to that of the seal member 38 of the previous example. Pressurized air is supplied from the air cooling passage 50 to the openings 48 and into the pocket 104. The pressurized air exerts a force on the seal member 106 to move the seal member 106 from a non-deployed position to a deployed position wherein the seal member 106 protrudes out of the pocket 104. In the deployed position, the seal surface 108 contacts the outer structure 26 with relatively uniform pressure.

The airfoil section 102 and the seal member 106 can be manufactured using the methods and materials as described above for the seal member 38 and airfoil section 32.

FIG. 7 illustrates another example of a vane 130 for use in the gas turbine engine 10, similar to the vanes 24 and 100 of the previous examples. Components that are similar to components of the previous examples are numbered alike. In this example, the vane 130 includes an airfoil section 132 having a pocket 134 located near an end of the airfoil section 132. The opening 48 connects the air cooling passage 50 of the airfoil section 132 with the pocket 134.

In the illustrated example, a seal member 136 is received at least partially within the pocket 134 for selectively sealing against the outer structure 26. The seal member 136 functions similar to the seal members 38 and 106 of the previous examples. However, in this example, the seal member 136 has a different shape.

The seal member 136 includes a wedge section 138 that utilizes air pressure differences to provide uniform sealing against the outer structure 26. The wedge section 138 includes a first wedge surface 140a and a second wedge surface 140b that are oriented at an acute angle relative to one another. The first wedge surface 140a corresponds to a sloped side wall 144 of the pocket 134, and the second wedge surface 140b engages the outer structure 26.

In the illustrated example, the wedge section 138 utilizes an air pressure difference to force the seal member 136 into contact with the outer structure 26. In this example, there is a first air pressure associated with the pressurized cooling air of the air cooling passage 50, a second air pressure associated with a high pressure side HP of the airfoil section 132, and a third air pressure associated with a low pressure side LP of the airfoil section 132. The first air pressure of the cooling air from the air cooling passage 50 is greater than the second air pressure, which is greater than the third air pressure. Thus, the pressurized cooling air from the air cooling passage 50 exerts a force on the seal member 136 in an upwards direction relative to FIG. 7, and the second air pressure associated with the high pressure side HP exerts a force on the seal member 136 toward the left in FIG. 7. The combined upwards and left force exerted by the first air pressure and the second air pressure tends to move the seal member 136 in the direction 146 such that the first wedge surface 140*a* slides along the sloped side wall 144 of the pocket 134 and the second wedge surface 140*b* is forced against the outer structure 26. Thus, the difference in pressures between the cooling air from the air cooling passage 50 and the hot gas flow of the high pressure side HP moves the seal member 136 into a deployed position to engage the outer structure 26 with a relatively uniform force.

As the seal member 136 wedges toward the outer structure 26, a gap may be created between the side wall 144 of the pocket 134. The pressurized cooling air may thereby leak from the pocket 134 to the high pressure side HP.

FIG. 8 illustrates another example of a vane 150 that is similar to the vane 130 of the previous example, except seal member 152 of the vane 150 is shaped differently than the seal member 136 of the previous example. Components that are similar to components of the previous example are numbered alike. In this example, the seal member 152 includes a wedge section 154 that functions similarly to the wedge section 138 of the seal member 136. However, in this example, the seal member 152 includes a protruding ridge 156 having a surface 158 that functions as a second wedge surface that cooperates with first wedge surface 140*a* to engage the seal member 152 with the outer structure 26 as described in the example shown in FIG. 7.

In this example, the wedge surface 158 provides a smaller area than the wedge surface 140*b* of the previous example, which may concentrate the sealing force over a smaller area to improve seal performance.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine component comprising:
   a fluid passage for providing a pressurized fluid;
   an airfoil; and
   a seal member for selectively providing sealing at an end of the airfoil, the seal member having a stowed position for non-sealing and a deployed position for sealing, wherein the seal member is operatively connected with the fluid passage for moving the seal member between the stowed position and the deployed position, wherein the seal member is formed from a ceramic material, a metal alloy material, or a composite material, wherein the seal member is a substantially planar plate, wherein the plate includes a thickness, a width that is greater than the thickness at all points along the plate, and a length that is greater than the width, wherein the width varies along the length.

2. The gas turbine engine component as recited in claim 1, wherein the fluid passage comprises an internal cooling passage within the airfoil.

3. The gas turbine engine component as recited in claim 1, wherein the end of the airfoil includes a pocket having the seal.

4. The gas turbine engine component as recited in claim 3, wherein the pocket includes a floor, side walls, and an open side.

5. The gas turbine engine component as recited in claim 4, wherein the seal member includes a first surface corresponding to the floor and a second surface corresponding to the open side of the pocket, and a portion of the second surface comprises a seal surface.

6. The gas turbine engine component as recited in claim 1, wherein the thickness varies along the length.

7. The gas turbine engine component as recited in claim 1, wherein the seal member comprises a wedge.

8. The gas turbine engine component as recited in claim 1, wherein the seal member is silicon nitride.

9. The gas turbine engine component as recited in claim 1, wherein the seal member is a nickel-based alloy.

10. The gas turbine engine component as recited in claim 1, wherein the seal member is a ceramic matrix composite.

11. The gas turbine engine component as recited in claim 1, wherein the seal member includes a protective coating.

12. The gas turbine engine component as recited in claim 11, wherein the protective coating includes at least one of titanium dioxide or carbide.

13. A gas turbine engine component comprising;
   a fluid passage for providing a pressurized fluid;
   an airfoil; and
   a seal member for selectively providing sealing at an end of the airfoil, the seal member having a stowed position for non-sealing and a deployed position for sealing, wherein the seal member is operatively connected with the fluid passage for moving the seal member between the stowed position and the deployed position, wherein the end of the airfoil includes a pocket having the seal, wherein the pocket includes a floor, sidewalls, and an open side, wherein at least one of the side walls includes a surface that forms a non-perpendicular angle with the floor.

14. A gas turbine engine component comprising;
   a fluid passage for providing pressurized fluid;
   an airfoil; and
   a seal member for selectively providing sealing at an end of the airfoil, the seal member having a stowed position for non-sealing and a deployed position for sealing, wherein the seal member is operatively connected with the fluid passage for moving the seal member between the stowed position and the deployed position, wherein the seal member includes internal cooling passages.

15. A gas turbine engine component comprising:
   a fluid passage for providing a pressurized fluid;
   an airfoil; and
   a seal member for selectively providing sealing at an end of the airfoil, the seal member having a stowed position for non-sealing and a deployed position for sealing, wherein the seal member is operatively connected with the fluid passage for moving the seal member between the stowed position and the deployed position, wherein the seal member includes seal side walls and a seal wall connecting the seal side walls, the seal side walls and the seal wall forming a cavity that opens to an open side of the seal member.

16. A gas turbine engine component comprising:
a fluid passage for providing pressurized fluid;
an airfoil; and
a seal member for selectively providing sealing at an end of the airfoil, the seal member having a stowed position for non-sealing and a deployed position for sealing, wherein the seal member is operatively connected with the fluid passage for moving the seal member between the stowed position and the deployed position, the seal member comprises a wedge, the wedge includes a first seal surface and a second seal surface that form an acute angle.

17. The gas turbine engine of claim 16, further including a pocket located near an axial end of the airfoil, wherein a wedge surface which engages a sloped wall of the pocket.

18. A method of providing sealing, comprising:
selectively moving a seal member relative to an end of an airfoil between a stowed position for non-sealing and a deployed position for sealing, wherein the seal member comprises a wedge including a first seal surface and a second seal surface that form an acute angle.

19. The method as recited in claim 18, further including fluidly connecting the seal member with a pressurized fluid source for moving the seal member between the stowed position and the deployed position.

20. The method as recited in claim 18, further including moving the seal member using cooling fluid from an internal cooling passage of the airfoil.

* * * * *